Feb. 18, 1969  HIROSHI KITAGAWA ET AL  3,428,555
METHOD AND AN APPARATUS FOR PURIFYING WASTE
Filed Jan. 3, 1967
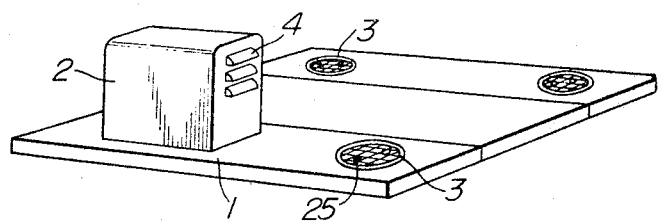
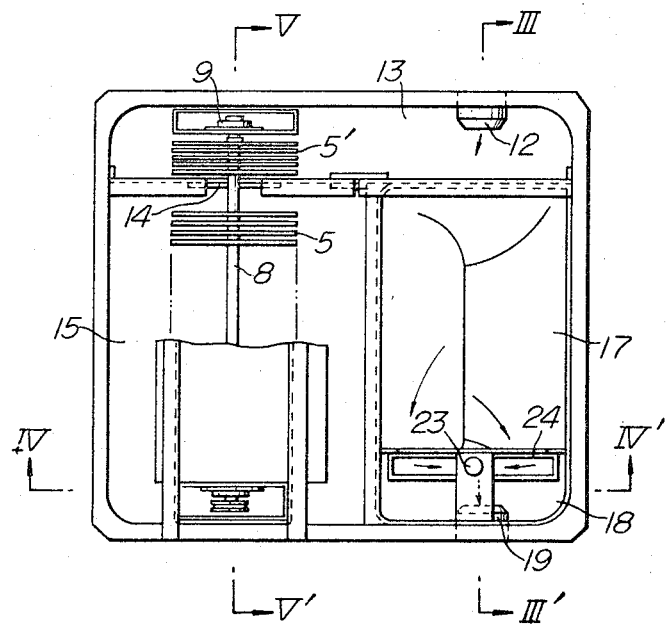
INVENTORS
HIROSHI KITAGAWA
YO MAEDA
SHUHEI NAKAMURA
TORU MIYAGI
SEIICHI ITOH
MINONDO KIMURA
YASUO SUZUKI
BY
ATTORNEY

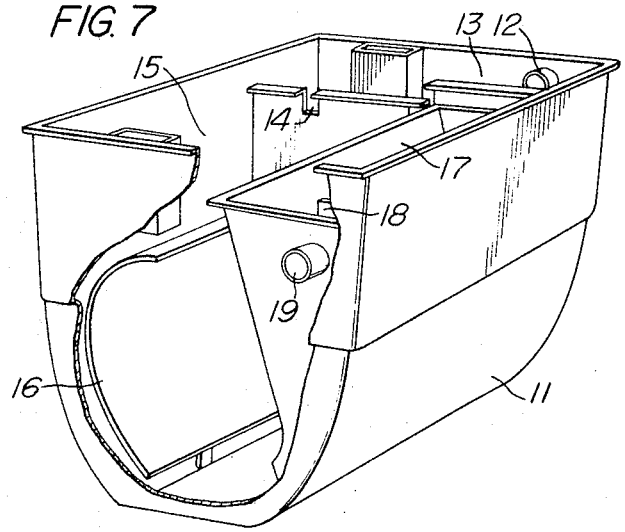
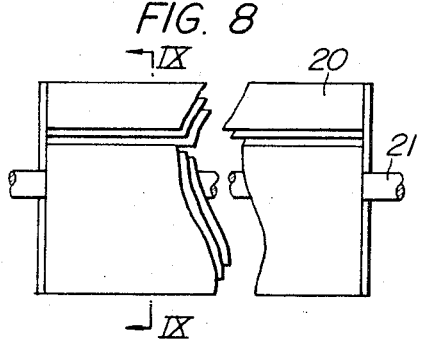
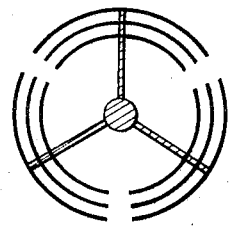

United States Patent Office 3,428,555
Patented Feb. 18, 1969

3,428,555
METHOD AND AN APPARATUS FOR PURIFYING WASTE
Hiroshi Kitagawa, Tokyo, and Yo Maeda, Shuhei Nakamura, Toru Miyagi, Seiichi Itoh, Minondo Kimura, and Yasuo Suzuki, Shimodate-shi, Japan, assignors to Hitachi Chemical Company, Ltd., Tokyo, Japan, a corporation of Japan
Filed Jan. 3, 1967, Ser. No. 606,678
Claims priority, application Japan, Jan. 10, 1966, 41/943; Mar. 4, 1966, 41/18,987, 41/18,988; Mar. 18, 1966, 41/24,081
U.S. Cl. 210—7   24 Claims
Int. Cl. C02c 1/08

ABSTRACT OF THE DISCLOSURE

The present disclosure is directed to a method and apparatus for aerobically purifying waste products in a vessel using aerobes or an activated sludge which is kept alive in a bath of said waste products in said vessel which comprises pulverizing and dissolving solid substances contained in the waste products by conveying the waste products through a dissolving zone containing smooth rotating surfaces, which successively contact the air and the waste products, further conveying said waste products through an aeration zone also containing smooth rotating surfaces, said rotating surfaces supplying oxygen, which is dissolved in water membranes adhesively disposed on said rotating surfaces, to the waste products, said rotating surfaces also providing a circulating flow sufficient to distribute the dissolved oxygen throughout the waste products and to prevent settling of the activated sludge and introducing the aerated waste products into a settling zone to separate the suspended activated sludge from the purified product, said settling zone being disposed in the aeration zone and having a gradually decreasing cross-sectional area from the upper portion to the lower portion of the vessel.

BACKGROUND OF THE INVENTION

Field of the invention

This invention relates to a method and an apparatus for purifying waste such as human waste, miscellaneous domestic waste, city sewage or industrial exhaust water. The industrial exhaust water can include pulp, medicine, food, fiber, waste from plating or oil and fat works and waste from a butchery.

Methods for purifying waste such as aerobic purification and anaerobic purification are well known.

Anaerobic purification utilizes the phenomena that some anaerobes adsorb and decompose organic matters or waste to obtain energy for living and convert the waste to more stabilized materials such as $CO_2$, $CH_4$, $H_2S$, $NH_3$, with less energy.

Aerobic purification utilizes the phenomena of adsorbing and digesting the sludge dissolved in the waste, by some aerobes or an activated sludge. This is called BOD (Biological Oxygen Demand) hereinunder. Such an activated sludge generally takes the following steps of increase and decrease: When the dissolved BOD is introduced into a purifying vessel, the activated sludge including, e.g., flagellates, ciliates, enzymes, etc., begins at once to adsorb and digest the BOD, which is thus progressively decreased. The activated sludge in turn grows in an accelerated manner and this step is called the logarithmic multiplication period. Soon the BOD or the feed becomes short and it is transferred to the attenuated multiplication period, where the multiplication curve begins to lie and then at last to fall. When all feed is consumed, the microbes enter the respiration period, where the microbes make internal respiration by consuming nutritive substances stored in the body. During this period, the amount of the sludge is decreased by self-oxidization.

This invention is intendedly in the field of utilizing the above microbiological phenomena to provide a new and improved method and apparatus for purifying the waste.

Description of the prior art

In the field of the aerobic purification various methods of application have been invented from the viewpoint of controlling the multiplication and self-oxidization of the activated sludge. From such a viewpoint, they can be classified into high rate activated sludge method, normal activated sludge method and total oxidization method.

The high rate activated sludge method employs a heavy activated sludge having high adsorbing ability, to which a large amount of waste is supplied, whereby a high rated adsorption and purification are effected. The activated sludge which has accomplished adsorption and purification is extracted from the vessel and subjected to aeration. The activated sludge, thus having recovered its adsorbing ability, is returned to the adsorption and purification, while a part of it is anaerobically decomposed in a digestion vessel.

The normal activated sludge method utilizes the adsorbing and purifying characteristics and the self-oxidizing characteristics of the activated sludge in a suitable relation. When the activated sludge and the waste are mixed and subjected to aeration, the activated sludge first rapidly increases by adsorbing the waste, but during the continuation of the aeration, the activated sludge consumes the nutritious substances adsorbed and recovers its adsorbing ability. A part of this activated sludge is returned to the aeration vessel, and the remainder is decomposed in a digestion vessel.

The total oxidization method utilizes the self-oxidizing characteristics of the activated sludge to its full extent, where a relatively thin activated sludge is subjected to a nutrition-shorted condition of thin waste. In this case there exists little excessive activated sludge, so that there is no necessity to extract any activated sludge. On the other hand, however, much oxygen is required for the self-oxidization. Thus a provision must be made for supplying a large amount of oxygen to the bath of the activated sludge and the waste.

In conventional methods of the aerobic purification, especially in the total oxidization method, the required oxygen is dissolved by injecting air in the form of bubbles or by agitating the surface of the waste by means of brushes or paddles. However, these methods have relatively low oxygen dissolving efficiencies and in addition they cannot generate a uniform flow in the bath which is necessary to distribute the dissolved oxygen uniformly in the bath, or the amount of oxygen to be dissolved. Thus the flow in the bath which is also required for pulverizing solid substances in the waste is not independently controlled. The present invention is intended to remove such deficiencies by a new and improved method and apparatus which will be described later in more details and with reference to preferred embodiments.

SUMMARY OF THE INVENTION

This invention can be applied to any method of aerobic purification utilizing activated sludge, but is especially applicable to the total oxidization method. The introduced human waste and also the activated sludge usually include some biologically inactive substances, and further inorganic sludge components gradually increase in the course of operation. Therefore it is necessary, even in the total oxidation method, to occasionally remove some excessive sludge out of the vessel, though it is possible to design the vessel to reduce the frequency to be, for example, once a year.

In the aerobic purification of the waste, it is essential to supply a required amount of oxygen into the purifying vessel and not to make the solid substances deposit in the vessel.

According to the present invention, there is provided a purifying apparatus comprising at least one rotating surface presenting member such as a disk or others (this will be called simply the disk or disks hereinunder for simplicity) which is rotatably mounted in the vessel with a portion of it being soaked under the level of the waste so that in rotation it can supply said required amount of oxygen by dissolving it in the water membrane adhesively disposed on the surface of the disk as well as it can cause a constant flow of waste in the vessel so as to prevent the settling of the sludge in the vessel. This method of aeration will be called the rotating disk aeration hereinunder for simplicity. The major advantages of this rotating disk aeration are that it has an excellent oxygen dissolving efficiency and that it can establish freely a flow of waste in the vessel independent of the oxygen dissolving rate. Obviously, a parallel laminate flow is desirable, but any required velocity of waste flow can be obtained according to the present method of aeration.

A method of mounting the disk rotatably in the vessel with a portion of it being soaked under the level of the waste is described hereinunder in an embodiment of the present invention, where the disk is positioned perpendicularly to the level of the waste. However it is to be understood that the disk may be positioned horizontally thus in parallel with the level of the waste with its one side being soaked under the level, or the disk may be inclined by a suitable angle against the level of the waste.

In conventional methods of the aerobic purification, the required oxygen is dissolved by injecting air in the form of bubbles or by agitating the surface of the waste by means of brushes or paddles. According to this method, however, it is difficult to independently control the amount of oxygen to be dissolved and the flow of the waste in the vessel. In addition, the rate of dissolving oxygen is low and the problem of deposition of the fresh waste is often brought about. In comparison with such known method, the rotating disk aeration method according to the present invention has the ability of providing more than about four times the aeration of the prior art and also provides more uniform flow of the waste.

An apparatus for purifying the waste incorporating the rotating disk aeration method according to the present invention comprises a dissolving vessel, an aeration vessel, a settling vessel and a sterilizing vessel, if required.

The dissolving vessel serves to mechanically and hydrodynamically pulverize the solid substances in the waste so as to pulverize the BOD and make it soluble prior to aeration and to directly lower the required amount of oxygen. According to an embodiment of this invention, a plurality of disks are rotated in this vessel with portions of them being soaked under the level of the waste. Thus a flow of the waste necessary for pulverizing the solid substances is generated and some oxygen is supplied by being dissolved in the water membrane adhesively disposed on the surface of the disks. Thus in this vessel short circuiting and solidifying of the fresh waste are prevented.

In the aeration vessel the rotating disk aeration is performed in full-scale, where a parallel flow of a proper velocity is generated and the dissolved BOD is dispersed uniformly. It is now subjected to the purification by the activated sludge under the presence of oxygen.

The settling vessel is in communication with the aeration vessel at its lower portion, and has a gradually increasing sectional area from the bottom toward the upper portion of it. As the sectional area is gradually increased toward its upper portion, the solid substances not yet purified and carried into the settling vessel from the inlet at the bottom portion is decelerated as it goes up and is separated from the carrying liquid and settles in the bottom.

The sterilizing vessel may be provided, if required, to sterilize the purified waste discharged from the settling vessel.

An object of the present invention is to provide a method of aerobic purification with a high purifying efficiency.

Another object of the present invention is to provide an improved purifying apparatus incorporating the rotating disk aeration, having a small and lightweight construction and enabling easy installation, maintenance and cleaning.

The invention will now be described with reference to the drawings in which are shown some preferred embodiments of the present invention.

BRIEF DESCRIPTION OF THE DRAWINGS

FIG. 1 is a perspective view of a cover of concrete slabs;

FIG. 2 is a top plan view of the purifying vessel after the cover of concrete slabs has been removed.

FIG. 7 is a perspective view of the purifying vessel with a portion of it being broken away;

FIG. 8 is a schematic outside view showing a layered rotating body as a modification of the aeration disks; and FIG. 9 is a sectional view taken along line IX–IX' in FIG. 7.

DESCRIPTION OF THE PREFERRED EMBODIMENTS

Figure 3:
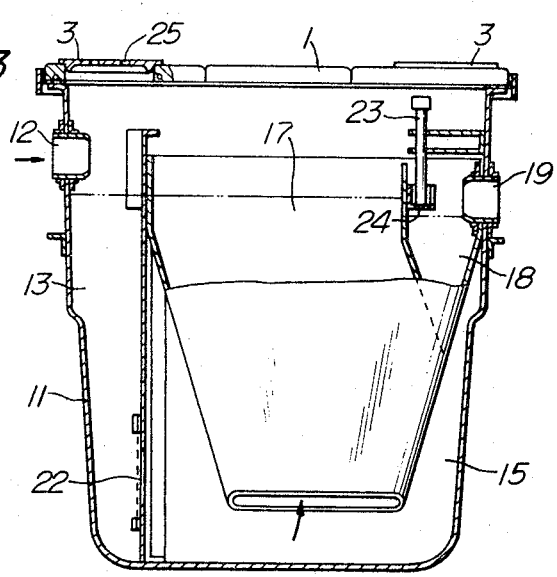
FIG. 3 is a sectional view taken along line III–III' in FIG. 2.

In the drawings, 1 is a concrete slab, 2 is a motor cover, 3 is a manhole cover, 4 shows ventilation openings provided at the motor cover in general, 5 and 5' are aeration disks, 6 is a frame, 7 is a motor, 8 is a shaft of the aeration disks, 9 are bearings for said shaft, 10 is a belt, 11 is a body of the purifying vessel, 12 is an inlet conduit of the human waste, 13 is a dissolving vessel, 14 is an overflow port, 15 is an aeration vessel, 16 is a guide plate, 17 is a settling vessel, 18 is a sterilizing vessel, 19 is an outlet conduit of the purified water, 20 is a cylinder with cut portions, 21 is a shaft, 22 is an opening provided through and at a lower portion of the partition between the dissolving vessel and the aeration vessel, 23 is a chemicals supply cylinder, 24 is a step box in which said chemicals supply cylinder is positioned, and 25 is a ventilation opening provided at the manhole cover.

Figure 4:
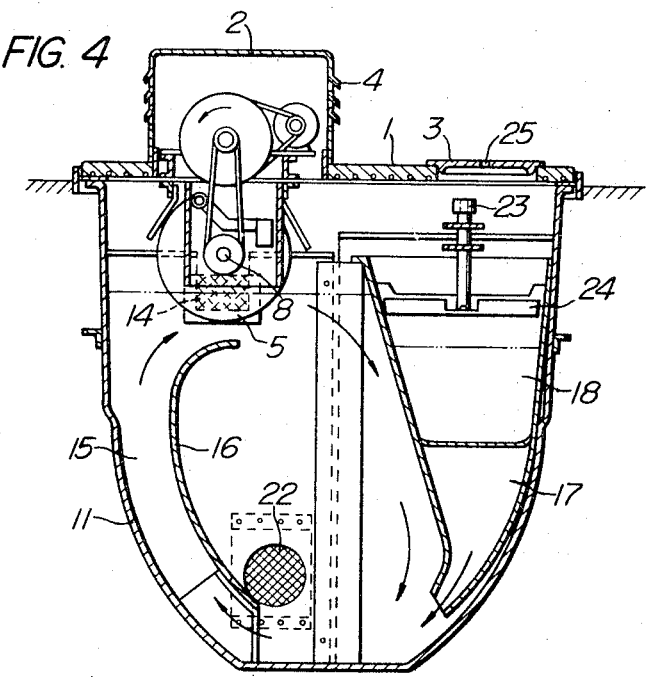
FIG. 4 is a sectional view taken along line IV–IV' in FIG. 2.
Figure 5:
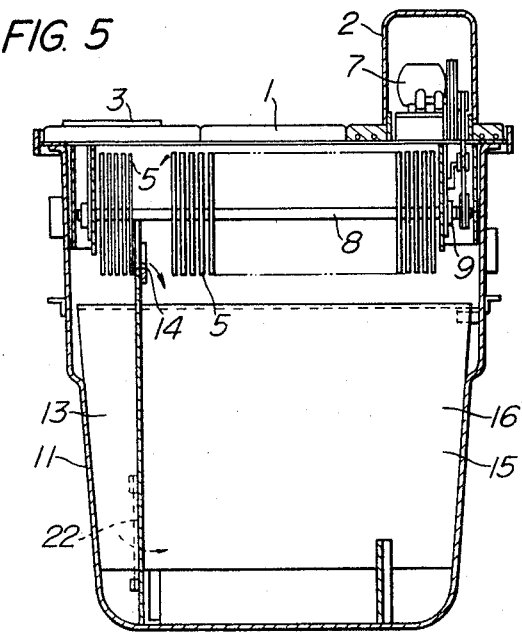
FIG. 5 is a sectional view taken along line V–V' in FIG. 2.
Figure 6:
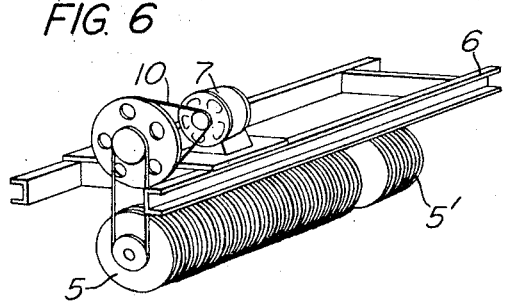
FIG. 6 is a perspective view of a rotating disk assembly as an embodiment of the present invention.

The aeration disks 5 and 5' are assembled as shown in FIG. 6 and are mounted at the upper portion of the purifying vessel as shown in FIGS. 2, 4 and 5. This aeration disk assembly includes a plurality of parallel disks mounted concentrically on a shaft which is mounted horizontally, thus in parallel with the level of the waste. A small number of disks 5' are located in the dissolving vessel, and a larger number of disks 5 are located in the aeration vessel, these disks being rotated by the motor 7 so that they effect rotating disk aeration in the respective vessels. The disks 5 and 5' may be made of thin plates of light, anticorrosive and rigid materials, but preferably they may be made of plates of a synthetic resin such as rigid polyvinyl chloride. A light and rigid foam of a rigid synthetic resin may also be used. The disk may be made in a shape other than the real disk in relation to other factors. Further the disk may be provided with some suitable projections or paddles to generate a strong flow of the waste. As a modification of the disks it is to be included within the scope of the present invention to use a helical rotor or a screw rotor which is rotated to generate a flow of the waste in its axial direction.

It is also possible to use a layered rotating body as shown in FIGS. 8 and 9 in place of the disks. This rotating body consists of several concentric cylinders 20 which are mounted on a common shaft 21 and are provided with some cut portions. Further it will be understood that other modifications such as to use rings or blocks in place of the disks can be made according to the requirements of the concerned.

In the embodiment shown in the drawings the size and the spacing of the disks are the same and uniform, but they may be changed continuously or discontinuously to cause some change in aeration or other special effects. For example, by changing the size of the disks continuously, it is possible to control the degree of aeration so that when the waste level in the purifying vessel is raised, the number of disks which are taking part in the aeration, i.e., in dissolving oxygen is increased, and when the level is lowered, the number of disks which are taking part in the aeration is also decreased. The spacial effects which can be obtained by changing the spacing of the disks will be described later. The selection of motor 7, shaft 8, bearings 9, belt 10 and other accessories can be made easily by the concerned.

The human waste with flushing water enters the dissolving vessel 13 through the inlet conduit 12. During the stay in this vessel the solid substances of large size are pulverized by the rotating disks 5 and are dissolved in the water while they are agitated by the flowing water. With the next charge of waste and water, a corresponding amount of the dissolved fluid in the dissolving vessel enters the aeration vessel through the overflow port 14. An improvement on the apparatus is possible by providing a baffle plate or a bag of net near the outlet portion of the waste inlet conduit 12 so that the solid substances can be stored for a time, making them dissolve gradually. The velocity of the waste flow in the dissolving vessel may preferably be in the range of 0.2 to 2.0 m./sec. The present embodiment employs a common shaft for both disks 5 and 5', but the disks 5' in the dissolving vessel 13 may be mounted on another shaft independent of the shaft for the disks 5 in the aeration vessel. The width of the dissolving vessel 13 may be narrowed from the waste inlet portion toward the overflow portion with the shaft of the rotating disks 5' being arranged in the same direction as that of the tapering. By this arrangement the space between the rotating disk and the wall of the vessel is gradually reduced and a better dissolving efficiency can be obtained.

In the aeration vessel 15, the disks 5 are rotating on the common shaft with the disks 5' in the dissolving vessel, and generate a parallel flow in the aeration vessel. Thus uniformly dissolved waste can be rapidly obtained, while preventing the deposition of the sludge on the bottom. For the purpose of smoothing the flow of the waste, there is provided in the dissolving vessel and the aeration vessel 15 a common guide plate 16.

The supply of oxygen is effected by the rotation of the disks 5 and 5'. The oxygen is dissolved in the water membrane adhesively disposed on the surface of the disks over the waste level and is carried into the bath of the waste by the rotation of the disks. This method of dissolving oxygen is characterized in that it can constantly provide a high oxygen dissolving efficiency throughout a long period of operation, requires a minimum of power, eliminates sludge adhesion, and the driving device can withstand long periods of operation. In the aeration vessel the BOD is rapidly digested by adsorption and eliminated. The dissolving vessel 13 and the aeration vessel 15 are fluidly connected by overflow port 14 and opening 22 provided at the lower portion of the partition. These openings can be provided with nets of synthetic resin to prevent the passing of solid particles therethrough. As a result of the charge of the dissolved waste into the aeration vessel from the dissolving vessel, a corresponding amount of the fluid in the aeration vessel enters the settling vessel 17 through the bottom port of the settling vessel.

It is sometimes advantageous in the viewpoint of digestion efficiency that the aeration vessel 15 operates as a multiple stage aeration vessel. When the aeration disks are alternately arranged in a manner as to have large and small spacings, the flow produced by the disks with the small spacing is faster than that produced by the disks with the large spacing. Because of the difference of the velocity, the faster flow portion acts as if it were a partition in the vessel and thus by a series of differences of the velocity, the vessel preferably operates as a multiple stage vessel. This is the effect of changing the spacing of the aeration disks, which was described before. It is also possible to make the aeration vessel to be of multiple stage directly by suspending a plurality of net plates of synthetic resin within the vessel.

In this embodiment the dissolved or pulverized BOD enters the aeration vessel through the overflow port 14 and the opening 22 provided at the upper and lower portion of the partition. It is also possible to make the dissolved BOD flow into respective stages of the vessel in parallel by employing a multistaged aeration vessel, which may be called a step aeration system.

Since there exist in the aeration vessel some solid particles of fresh waste and the activated sludge, it is possible to arrange in the aeration vessel, if necessary, a sludge storing vessel having an upper inlet port and a lower outlet port for the purpose of controlling the amount of the activated sludge operating in the aeration vessel. The inside of the sludge storing vessel is not supplied sufficient oxygen, so that the purification of the waste in this region is suppressed. The velocity of flow in the aeration vessel may preferably be in the range of 0.01 to 0.5 m./sec.

The almost purified waste in the aeration vessel enters the settling vessel 17 with the suspended substances of the activated sludge. The settling vessel 17 has an inlet port opening in the aeration vessel at its bottom and has a gradually increasing sectional area from the bottom toward the upper portion of said vessel. The purified waste which passes up through the settling vessel gradually decelerates as the sectional area increases until in its upper region the velocity becomes smaller than the sedimentation velocity of the suspended substances of the activated sludge. Thus complete separation between the solid particles and the liquid is effected to allow only the purified water discharged out of the settling vessel.

The suspended substances while settling back toward the aeration vessel, partially stick to the side and bottom portions of the settling vessel. In this flocky deposition the oxidized nitride contents $NO_2^-$ and $NO_3^-$ are reduced to $N_2$ gas, whereby the substances float up with the gas. These floating substances can be easily settled out again by permitting the gas to dissipate out of the scum or by producing mechanical impacts such as tapping or a slight amount of vibrating. Alternatively, the activated sludge floating at the surface may be transferred back to the aeration vessel 15 by driving a screw conveyor, bucket conveyor or belt conveyor provided with paddles skimming over the surface of the water.

It is often more convenient to discharge a constant amount of the purified water out of the settling vessel intermittently than continuously. For this purpose the discharge portion may be closed by a door which is slightly urged by a spring from the outside against opening so that it is opened by water pressure when a predetermined level of the water was attained, or the discharge portion may be closed by a sheeting which is releasably supported from inside so that it is to be brought down to open the dam, allowing an amount of the purified water at a time when a predetermined level was attained.

The purified water discharged from the settling vessel enters the sterilizing vessel 18. The cylinder 23 charged with sodium calcium hypochlorite tablets is provided on the way to the discharge port 19 in the sterilizing vessel 18 so that the tablets are soaked and become dissolved out in the water which is discharged through this region. The cylinder 23 which is charged with the sterilizing agent is placed on the step 24 higher than the water level in the sterilizing vessel 18. Thus the dissolving out of the tablets is effected only when the purified water is discharged through the step 24. The step 24 and/or the cylinder 23 may be suitably inclined for the purpose of controlling the dissolving extent of the tablets.

Air required for the aeration is supplied through the ventilation openings 4 provided at the motor cover as well as the ventilation openings 25 provided at the manhole covers over the aeration, settling and sterilizing vessels.

The purifying vessel body 11 may be made of FRP which is glass wool saturated with polyester resin and has excellent anticorrosive characteristics against chemicals. The partitions between vessels may be made of a suitable synthetic resin.

As described in the above, the method of purifying waste of the present invention has an excellent oxygen dissolving efficiency, generates most preferable flows, e.g., parallel laminar flows in the vessels, and has an excellent purifying efficiency. In addition, the purifying apparatus has very simple construction, and it can be made much smaller than conventional purifying vessels with easier installation, maintenance and cleaning.

What is claimed is:

1. An apparatus for aerobically purifying waste products which comprises a purifying vessel containing a dissolving chamber, an aeration chamber and a settling chamber, an inlet conduit for introducing the waste products to be treated into the dissolving chamber, pulverizing and aeration means rotatably disposed within the dissolving chamber and the aeration chamber, means for providing fluid communication between the dissolving chamber and the aeration chamber, said settling chamber being disposed in the aeration chamber and having a gradually decreasing cross-sectional area from the upper portion to the lower portion of said vessel, said settling chamber having an inlet port which opens near the bottom of said aeration chamber and an outlet conduit for removing the purified material from the settling chamber.

2. The apparatus of claim 1, wherein a sterilizing chamber is disposed in the upper portion of the settling chamber and communicates therewith, said sterilizing chamber containing a cylinder which is charged with a sterilizing agent and placed on a step box in the vicinity of the outlet conduit.

3. The apparatus of claim 1, wherein the pulverizing means is a helical rotor or a screw rotor.

4. The apparatus of claim 1, wherein the pulverizing means comprises at least one rotating body containing several concentric discontinuous cyclinders.

5. The apparatus of claim 1, wherein the pulverizing means comprises a plurality of rings or blocks.

6. The apparatus of claim 1, wherein netting means is provided near the inlet conduit for storing the solid substances of the waste product.

7. The apparatus of claim 1, wherein the aeration chamber is divided into multiple stages by suspending a plurality of net plates within the chamber.

8. The apparatus of claim 1, wherein a partition means separates the dissolving chamber from the aeration chamber and the fluid communication means between said chambers is provided by an overflow port in the top of the partition and opening in the lower portion of the partition.

9. The apparatus of claim 8, wherein the overflow port and the opening in the lower portion of the partition are provided with netting to prevent the passage of solid particles therethrough.

10. The apparatus of claim 8, wherein the pulverizing means are a plurality of aeration disks concentrically mounted on a shaft and rotated by a motor means.

11. The apparatus of claim 10, wherein the aeration disks are substantially parallel to each other with a larger number disposed in the aeration chamber than in the dissolving chamber.

12. The apparatus of claim 10, wherein the disks are provided with paddle means to generate a strong flow of the material being treated.

13. The apparatus of claim 10, wherein the aeration disks in the dissolving chamber and aeration chamber are mounted on independent shafts, the width of the dissolving vessel being narrowed from the inlet conduit to the overflow port thereby gradually reducing the space between the rotating disks and the walls of the chamber.

14. The apparatus of claim 10, wherein the aeration disks are arranged in the aeration chamber in groups, the space between disks of alternate groups being small and large respectively.

15. An apparatus for aerobically purifying waste products which comprises a purifying vessel containing a dissolving chamber, an aeration chamber and a settling chamber, an inlet conduit for introducing waste products to be treated into the dissolving chamber, a plurality of aeration disks rotatably disposed on a common shaft in the upper portion of the dissolving chamber and the aeration chamber, partition means separating the dissolving chamber from the aeration chamber, said partition means being provided with an overflow port in its upper portion and an opening in its lower portion, said settling chamber being disposed in the aeration chamber and tapered with its small end opening near the bottom of said aeration chamber and an outlet conduit for removing the purified product from the settling chamber.

16. The apparatus of claim 15, wherein a sterilizing chamber is disposed in the upper portion of the settling chamber and communicates therewith, said sterilizing chamber containing a cylinder which is charged with a sterilizing agent and placed on a step box in the vicinity of the outlet conduit.

17. The apparatus of claim 15, wherein guide plate means is disposed in the aeration vessel, said guide plate means forming a channel with the wall of the aeration vessel.

18. The apparatus of claim 15, wherein the purifying vessel is provided with a ventilated cover.

19. A method for aerobically purifying waste products in a vessel using aerobes or an activated sludge which is kept alive in a bath of said waste products in said vessel which comprises pulverizing and dissolving solid substances contained in the waste products by conveying the waste products through a dissolving zone containing smooth rotating surfaces, which successively contact the air and the waste products, further conveying said waste products through an aeration zone also containing smooth rotating surfaces, said rotating surfaces supplying oxygen, which is dissolved in water membranes adhesively disposed on said rotating surfaces, to the waste products, said rotating surfaces also providing a circulating flow sufficient to distribute the dissolved oxygen throughout the waste products and to prevent settling of the activated sludge and introducing the aerated waste products into a settling zone to separate the suspended activated sludge from the purified product, said settling zone being disposed in the aeration zone and having a gradually decreasing cross-sectional area from the upper portion to the lower portion of the vessel.

20. The method of claim 19, wherein after the aerated waste products are introduced into the settling zone the solid substances not yet purified are decelerated causing them to settle in the bottom of the settling zone and the aeration zone.

21. The method of claim 19, wherein the purified product is sterilized by treating it with chemicals before it is removed from the process.

22. The method of claim 19, wherein the velocity of flow of the waste products during pulverizing and dissolving is about 0.2 to 2.0 m./sec.

23. The method of claim 19, wherein a variety of flow velocity is provided in the aeration zone.

24. The method of claim 19, wherein the velocity of flow of the waste products during aeration is about 0.01 to 0.5 m./sec.

References Cited

UNITED STATES PATENTS

| | | | |
|---|---|---|---|
| 2,098,152 | 11/1937 | Kessener | 210—221 X |
| 2,684,941 | 7/1954 | Pasveer | 210—209 |
| 3,161,590 | 12/1964 | Weis et al. | 210—221 |
| 3,266,786 | 8/1966 | Grimes et al. | 261—92 |
| 2,901,114 | 8/1959 | Smith et al. | 210—15 X |

FOREIGN PATENTS 1,230,940  4/1960  France.

MICHAEL E. ROGERS, *Primary Examiner.*

U.S. Cl. X.R.

210—14, 17, 64, 151, 221, 256; 261—92